United States Patent [19]

Grasmann

[11] Patent Number: 5,680,096

[45] Date of Patent: Oct. 21, 1997

[54] PROCESS AND APPARATUS FOR MONITORING A VEHICLE INTERIOR

[75] Inventor: Ulrich Grasmann, Düsseldorf, Germany

[73] Assignee: Kiekert Aktiengesellschaft, Heiligenhaus, Germany

[21] Appl. No.: 502,419

[22] Filed: Jul. 17, 1995

[30] Foreign Application Priority Data

Jul. 16, 1994 [DE] Germany ............... 44 25 177.7
Jul. 7, 1995 [DE] Germany ............... 195 24 781.7

[51] Int. Cl.⁶ ........................................... G08B 13/00
[52] U.S. Cl. .................. 340/426; 340/429; 340/541; 340/566
[58] Field of Search ................... 340/426, 429, 340/541, 546, 566, 522, 552; 307/10.2; 180/287; 367/93, 906

[56] References Cited

U.S. PATENT DOCUMENTS 4,952,931  8/1990  Serageldin et al. .............. 340/902
5,229,748  7/1993  Ehringer et al. ................. 340/426
5,376,919  12/1994  Rickman ........................ 340/429
5,389,911  2/1995  Madau ........................... 340/426
5,424,711  6/1995  Müller et al. ................... 340/426
5,510,765  4/1996  Madau ........................... 340/429

FOREIGN PATENT DOCUMENTS

9003065 U  12/1990  Germany.

*Primary Examiner*—Jeffery Hofsass
*Assistant Examiner*—Edward Lefkowitz
*Attorney, Agent, or Firm*—Herbert Dubno

[57] ABSTRACT

A monitoring of a vehicle interior is effected by detecting sound waves in a vehicle interior, either from an incursion source or as reflected as echo waves and decomposing the electrical signals representing those detected sound waves into measurement vectors which are compared with sample vectors in a neural network so that a correlation parameter is generated which triggers an alarm when the correlation parameter indicates incursion. The system can respond first to glass breakage before an echo system is used to then further establish the nature of the incursion.

18 Claims, 2 Drawing Sheets

PROCESS AND APPARATUS FOR MONITORING A VEHICLE INTERIOR

FIELD OF THE INVENTION

My present invention relates to a method of monitoring a vehicle interior and, more particularly, to a method of detecting incursions into a vehicle like, for example, an attempt to despoil or circumvent a vehicle lock, the breaking of a vehicle window, or some other effort to gain access to the vehicle interior.

BACKGROUND OF THE INVENTION

There have been attempts to protect the interior of the vehicle from an incursion, utilizing an electroacoustic detector responsive to sound waves and converting those sound waves in the interior of a vehicle into an electrical measurement signal.

The electrical measurement signal can be amplified by an amplifier circuit and can activate an alarm device. The sound detector can be an electroacoustic element or transducer which is responsive to sound waves in the audible and/or ultrasonic ranges and which transform the sound waves into electrical oscillation.

The sound waves can be waves which are transmissible through gaseous media, air in the case of a vehicle interior, or so-called body waves, namely, waves which are transmitted through the vehicle chassis or other solid bodies forming the vehicle interior.

The electrical oscillations are processed as measurement signals, usually with the aid of analog amplification. The alarm device can be an acoustic and/or optical signal generator. For example, the alarm device can be a horn or other sound generator commonly provided for the vehicle and/or an illumination or source lamp forming part of the vehicle, for example the headlight. The alarm can also be a signal generator independent from the vehicle electrical circuitry. The alarm can produce a radio signal which can be picked up by a radio wave receiver remote from the vehicle.

Utilizing such means, an incursion into the interior of a vehicle can set off an alarm. The incursion may be the breaking of a vehicle window, an impact upon the window, insertion of a mechanical device for unauthorized activation of the vehicle lock mechanism, or simply the entry of an unauthorized person through a door of the vehicle by opening of the door, or an incursion into the vehicle space in some other manner.

A process of the aforedescribed type is known from the German Utility Model DE-G 90 03 065.6 U1. In this process the evaluation of the measurement signal may be an evaluation of amplitude, time or frequency and the comparison is effected with stored amplitude thresholds. If the amplitude threshold is exceeded or the measured value falls below the amplitude threshold, the alarm is activated.

This prior alarm system has, however, not been found to be sufficiently reliable against false alarms since there are numerous conditions for which amplitude thresholds cannot be adequately determined. Such conditions include, for example, impacts on the body of the vehicle, temperature fluctuations and air flows in the vehicle which may influence the measurement signal. Furthermore, damping and/or reflection and/or refraction or interference in the sound waves because of objects within or brought into the vehicle may also influence the results or give rise to a false alarm signal.

OBJECTS OF THE INVENTION

It is, therefore, the principal object of the present invention to provide an improved process for monitoring the interior of a vehicle which provides more reliable detection of incursions and a high degree of reliability against false alarms.

Another object of the invention is to provide an improved process for monitoring a vehicle interior which will obviate any drawbacks of the aforedescribed system.

Another object of this invention is to provide an improved apparatus for monitoring a vehicle interior or for carrying out the improved method of this invention.

SUMMARY OF THE INVENTION

These objects and others which will become apparent hereinafter are attained, in accordance with this invention, in a process for monitoring the interior of a vehicle whereby at least one sound detector or pick-up responds to sound waves in the interior of the vehicle and converts those detected sound waves into a time-dependent electrical measurement signal which is amplified by a respective amplifier. The amplified electrical measurement signal is fed to a computer in which the electrical measurement signal is decomposed into a series of individual measured values and each discrete measured value is stored with a measured signal as a vector in a memory. The vector is applied to the inputs of a neural network formed in the computer and the vector in the neural network is compared with at least a sample vector and a similarity parameter or correlation parameter is formed. The alarm device is then activated by the neural network, depending upon the correlation parameter.

When a plurality of sound pick-ups or detectors are used, it will be self-understood that a plurality of different measurement signals can result. As sample vectors, vectors are used which theoretically or experimentally are developed from measured signals for the state of the vehicle interior. A sample vector can also be a previously-detected vector.

By means of a comparison between the vector and the sample vector, it can be determined whether the actual determined vector represents an incursion into the interior of the vehicle.

The measured value vector (and the sample vector corresponding thereto) can represent only information as to amplitude values or can contain additional information with reference to time rate of change of the amplitude values, i.e. the characteristic with time. The time contribution can be either linear or nonlinear, for example logarithmic compression.

It will be understood that in any case a defined time interval is used for the detection or for the decomposition of the measured value signal. It is especially possible in accordance with the invention to operate with amplitude and/or energy transients of the measurement signal.

By means of the comparison between the measure value vector and the sample vector, a similarity parameter, hereinafter referred to as the correlation parameter, is obtained which, depending upon the comparison, can signal a high probability of incursion into the interior of the vehicle or with a high probability that there has been no incursion. A predetermined probability threshold can thus be used to define a boundary value of the correlation parameter which, if passed, will trigger the alarm. Of course, a plurality of different sample vectors, for example, representing different incursions, can be used with the system differentiating between such indications.

The invention utilizes the fact that an appropriately configured neural network can respond to measured signals which may vary widely but nevertheless can be associated with sample signals or vectors to trigger an alarm function when there has been an incursion into the vehicle interior or will not permit an alarm signal to be triggered if the vehicle interior remains normal or under normal conditions. The adaptive character of a neural network or the association capabilities thereof allow determination of identity probability, namely, a correlation parameter which will be meaningful upon comparison with the sample even if the measured signal can vary from an ideal state but the sample signal represents the ideal state.

According to the invention, therefore, not only is the neural network used because of its adaptive capability but because of the adaptivity of the internal network characteristic, it is possible to obtain a best fit to an identity or association relationship for activation of the alarm system and thus a correlation parameter/threshold value relationship that enables reliable alarm triggering without undue false alarms. The development of an adaptivity coefficient utilizing the correlation parameters determined from a plurality of sample vectors or as the activation criterion can provide greater reliability. Since the correlation parameter can be used for adaptive modification of the neural network response, the correlation parameter has a dual function, namely that of operating the alarm and that of modifying the neural network for various operating conditions.

As is known, a neural network can have various constructions. Basically one can distinguish between back-coupled and forward-coupled neural networks and for practically every neural network, a back-coupled or forward-coupled configuration can be provided. Sample vectors are provided in one or more weighting matrices or are stored as so-called target vectors in the neural network. The feeding of the sample vectors can be independent of the type of neural network of various types.

In back-coupled networks, a weighting matrix can be directly programmed or provided with so-called "training". In the latter case, simulated vectors, sample vectors and the information as to the learning rules are given. With the simulated vectors, the conditions which can arise in different circumstances are represented.

Forwardly-coupled neural networks, especially those which operate with nonlinear transfer functions, indicate a learning capacity also. In the case in which a false alarm arises, the information that a false alarm has arisen can be fed to the neural network which reduces the probability that under the same set of conditions, a false alarm will arise in the future. Neural networks can be simulated by appropriate programs in Von Neumann computers. Substantially faster and of lower cost and of lower current consumption are neural networks which are implemented by hardware and have a true parallel operation of the processor nodes (neurons) which are operated synchronously or asynchronously.

The parallel inputs of the neural network in this case are supplied with the elements of a vector simultaneously.

Various categories of neural networks which can be used in accordance with the invention are described in detail in R. Rojas, Theorie der neuronalen Netze, (Theory of Neural Networks) Springer-Verlag, 1993.

Basically the process of the invention can be carried out in two different variants. In one of these alternatives, the sample vector is formed from a signal which is picked up in the course of an incursion into the vehicle. The alarm device is then activated when the measured vector and the sample vector are sufficiently similar based upon the correlation parameter.

In a second alternative, the sample vector is also formed from a measured signal but without the need for an incursion into the vehicle. Then the alarm device is activated when the measured vector and the sample vector, also in dependence upon the correlation parameter, are sufficiently dissimilar. In the latter variant, previous measured vectors can be utilized as sample vectors for subsequent measurements. This can result in a better match to slightly varying conditions in the vehicle interior.

According to the invention, it is possible to initially operate with sufficient dissimilarity from a sample vector originally obtained without incursion, followed by an operation which responds to sufficient similarity based upon a sample vector generated upon an incursion.

A very high reliability against false alarms can be achieved when the neural network is an adaptive resonance theory (ART) network and when the similarity parameter or correlation parameter is the adaptive coefficient thereof. In this embodiment, the adaptive control system can be so effected that with insufficient similarity of the measured vector with any sample vector will not result in storage of the measured vector as the new sample vector.

The ART network is characterized by a high efficiency and responsiveness, but requires comparatively large processor capacity. A somewhat simpler neural network can be formed as an associative memory, for example, a Hopfield network or a similar configuration with the correlation parameter being the Hamming distance.

In an especially advantageous embodiment, the invention operates with a computer composed at least in part of fuzzy logic components and/or a program for fuzzy logic. With fuzzy logic, we can operate without binary vector elements but rather with vector elements that are not sharply defined.

The formation of the vectors (and correspondingly also of the sample vectors) can be effected in various ways. Because of the band-width conditions, it is advantageous to provide the amplified electrical measurement signals before they are fed to the computer with a processing through a rectifier and a filter to transform the signal into an envelope-curve measurement signal from which an envelope-curve vector is formed. The measured envelope curve vector can be compared with one or more stored envelope curve sample vectors. With this embodiment, a high degree of reliability against false alarms can be obtained with a significantly reduced data volume.

The formation of the envelope curves and the processing of the vectors from envelope curves, by reducing the data volume, allows the process to be more rapid or enables a lower capacity computer, i.e. a computer which is less expensive, to be used.

Especially high reliability against false alarms is obtainable when the measurement signal in the computer is initially spectrally analyzed, preferably by means of a fast Fourier transform algorithm, in which the spectrally-analyzed measurement signal forms a Fourier transform vector and the comparison of the Fourier transform sample vectors stored in the computer is then carried out. Spectral analysis means the transformation of the measurement or sample signal from the time domain as measured to a frequency domain. This is usually carried out by means of discrete Fourier transformation.

In an especially simple and, from the point of view of energy consumption, advantageous embodiment of the invention, the comparison of the measurement vector with a sample vector detects a break of a window of the vehicle, i.e. the sound waves involved are those which corresponds to such window breakage. In this embodiment, an impact upon a vehicle window which results in breakage can be readily recognized because the measurement signal resulting in breakage differs significantly from an impact without breakage. This is especially the case when energy transients are considered. With an impact without breakage, the vehicle window oscillates for a substantial period of time with correspondingly longer sound waves being generated. The maximum amplitude is also significantly lower. In this embodiment an incursion into the vehicle skin can be monitored. Preferably the part of the measured signal which is processed is that which has a frequency above 5 kHz.

In another embodiment of the invention the entire volume of the interior of the vehicle is monitored by generating at least one primary sound wave pulse therein with at least one sound wave generated. This pulse is radiated throughout the interior of the vehicle body and is reflected therein and arrives at the detector or detectors in the form of a reflected wave upon which other sound waves are superimposed for conversion into an electrical measurement signal whose vector can be compared with sample vectors which also correspond to reflected and superimposed sound waves from the vehicle interior. This embodiment thus operates with both measured signals and sample signals whose signal characteristics are determined by the transit time of the echoes from the inner walls of the vehicle and from structures in the interior thereof. In this case additional interference arises.

After the operator leaves the vehicle and sets the alarm, one or more primary sound wave pulses are triggered to irradiate the interior and produce outputs from the detectors which are processed and stored as sample vectors with which subsequent measurement signal vectors are then compared. This ensures that any false alarm will be generated upon variation in the interior structure or configuration of the vehicle body. It has been found to be especially advantageous to monitor in the manner described initially the interior of the vehicle for window glass breakage and then trigger a primary sound wave pulse within the interior to detect a type of incursion. In this manner the sound wave generator need not operate for extended periods of time and need only be activated once glass breakage has been detected.

Since both sound receivers and transmitters have directional characteristics, it is advantageous to provide a plurality of such receivers or transmitters, which can then operate through multiplexers into or from the computer.

The method of the invention thus can comprise:

(a) detecting a sound wave in an interior of a vehicle;

(b) generating a time-dependent electrical measurement signal representing the detected sound wave;

(c) amplifying the time-dependent electrical measurement signal;

(d) feeding the amplified time-dependent electrical measurement signal to a computer and in the computer decomposing the amplified time-dependent electrical measurement signals into discrete measured-value signals and storing the discrete measured-value signals as respective individual vectors in a memory of the computer;

(e) applying each vector to inputs of a neural network formed by the computer and processing the vector in the neural network by comparison with at least one sample vector to form a correlation parameter representing similarity of a measured-value signal vector and a sample vector; and (f) activating an alarm device by the neural network in dependence upon the correlation parameter.

The apparatus can comprise:

at least one detector in an interior of the vehicle for detecting a sound wave in the interior of the vehicle and generating a time-dependent electrical measurement signal representing the detected sound wave;

an amplifier connected to the detector for amplifying the time-dependent electrical measurement signal;

a computer connected to the amplifier and fed with the amplified time-dependent electrical measurement signal for decomposing the amplified time-dependent electrical measurement signals into discrete measured-value signals and storing the discrete measured-value signals as respective individual vectors in a memory of the computer, the computer forming a neural network to inputs of which each the vector is applied for processing of the vector in the neural network by comparison with at least one sample vector to form a correlation parameter representing similarity of a measured-value signal vector and a sample vector; and an alarm device connected to the computer and activated by the neural network in dependence upon the correlation parameter.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
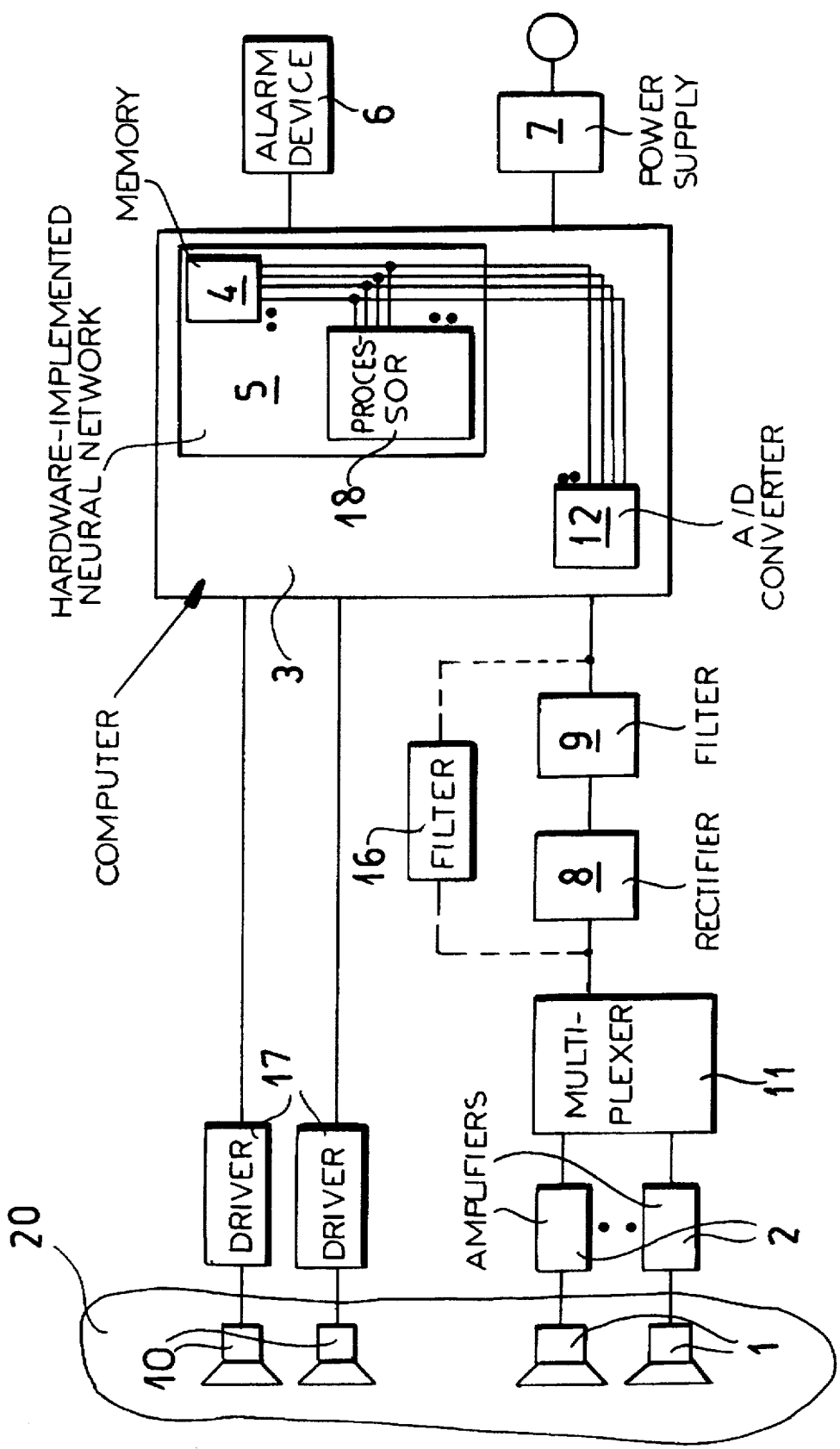
FIG. 1 is a block diagram of a system according to the invention for monitoring the interior of a vehicle.

In FIG. 1, a plurality of sound receivers are pick-ups 1 which are provided in a vehicle interior 20 and transform sound waves picked up from the interior into respective electrical measurement signals. These electrical measurement signals are applied to respective amplifiers 2 at the output of which appear the amplified electrical measurement signals.

The outputs from all of these amplifiers, when more than one amplifier and detector are provided, are applied to a multiplexer 11. The output of the multiplexer 11 is supplied to a computer represented highly diagrammatically at 3.

Upstream of the computer, in a preferred embodiment of the invention, a rectifier 8 and a filter 9 can be provided for forming the envelope curves of the measurement signals before the amplified measurement signal is applied to the computer.

Alternatively, the multiplexer 11 can be connected to the computer by a filter 16.

The computer 3 comprises a multiplicity of processors represented at 18, and a memory 4, and an architecture represented generally at 5 which forms a neural network and which can be implemented by hardware to include the memory 4 and the processors 18.

An analog-digital converter 12 is provided which transforms the measurement signal, whether in the form of an envelope or the full signal, into digital data sets which in binary form can be processed by the computer.

The computer can have an output to an alarm device 6 which can be an acoustic or optical alarm or a combination of the two, or a radio wave or other wireless alarm transmitter for the activation of a remote alert facility. A power supply 7 is likewise connected to the computer. The alarm device 6, and/or the power supply 7 can be devices normally provided in the vehicle such as the battery and generator system for the power supply and the lights and horn for the alarm device.

The computer can also control sound-generating transducers 10 with respective drivers 17 in the event primary sound wave pulses are to be generated in the interior of the vehicle.

As has been described, the sound wave detectors 1 pick up sound waves from the monitored interior of the vehicle and convert them to electrical measurement signals which are amplified in the amplifier. In the embodiment of FIG. 1, where the rectifier 8 and filter 9 are provided, the electrical measurement signals are converted into envelope-curve measurement signal. In the embodiment in which the filter 16 is used, the measurement signal free from noise components, can be supplied to the computer 3, e.g. for spectral analysis therein. The computer 3 can have a variety of architectures. The computer can, if desired, operate the transducers 10 via the driver 17 to produce primary sound wave pulses.

The computer unit 3 and the neural network 5 are so programmed that, in predetermined time-spaced intervals, there is alternatively either a comparison of a measurement vector with a sample vector representing the sound wave for a break of glass of the vehicle, or the emission of a primary sound wave pulse and the comparison of a detected reflected sound wave vector and a sample vector which represents incursion into the vehicle. With sufficient similarity of a measured vector with a sample vector representing glass breakage, a primary sound wave pulse is immediately triggered and comparison is effected with the measured vector of a detected reflected wave and any perturbation superimposed thereon and a sample vector.

With this mode of operation, two different approaches to monitoring the interior of the vehicle can be discerned. In the first approach, the interior of the vehicle is monitored against break-in utilizing glass breakage. The electric current utilization is comparatively small and, for the second technique utilizing emission of a primary sound wave pulse within the vehicle, only a short period is utilized at infrequent intervals. The overall power consumption is thus low. However, once a glass breakage has probably been detected, the echo system is immediately triggered to determine any change in the vehicle interior, thereby triggering an alarm in the case of an actual incursion. The power utilization for this system is low, the alarm signal is triggered reliably and false alarms are minimal.

For each comparison in the neural network, measurement vectors are used and are compared with sample vectors which can represent a prior state so that the comparison can represent a change of state. In this case, lack of comparison can provide the correlation parameter which can trigger an alarm upon the determination of a difference, i.e. a state in which there is no correlation between the measured vector and the sample vector.

The alarm device 6 can also be triggered upon comparison by the neural network of a vector with a sample vector which results from a prior reflected sound wave in the vehicle interior. In this case only the second mode of operation is utilized.

Figure 2:
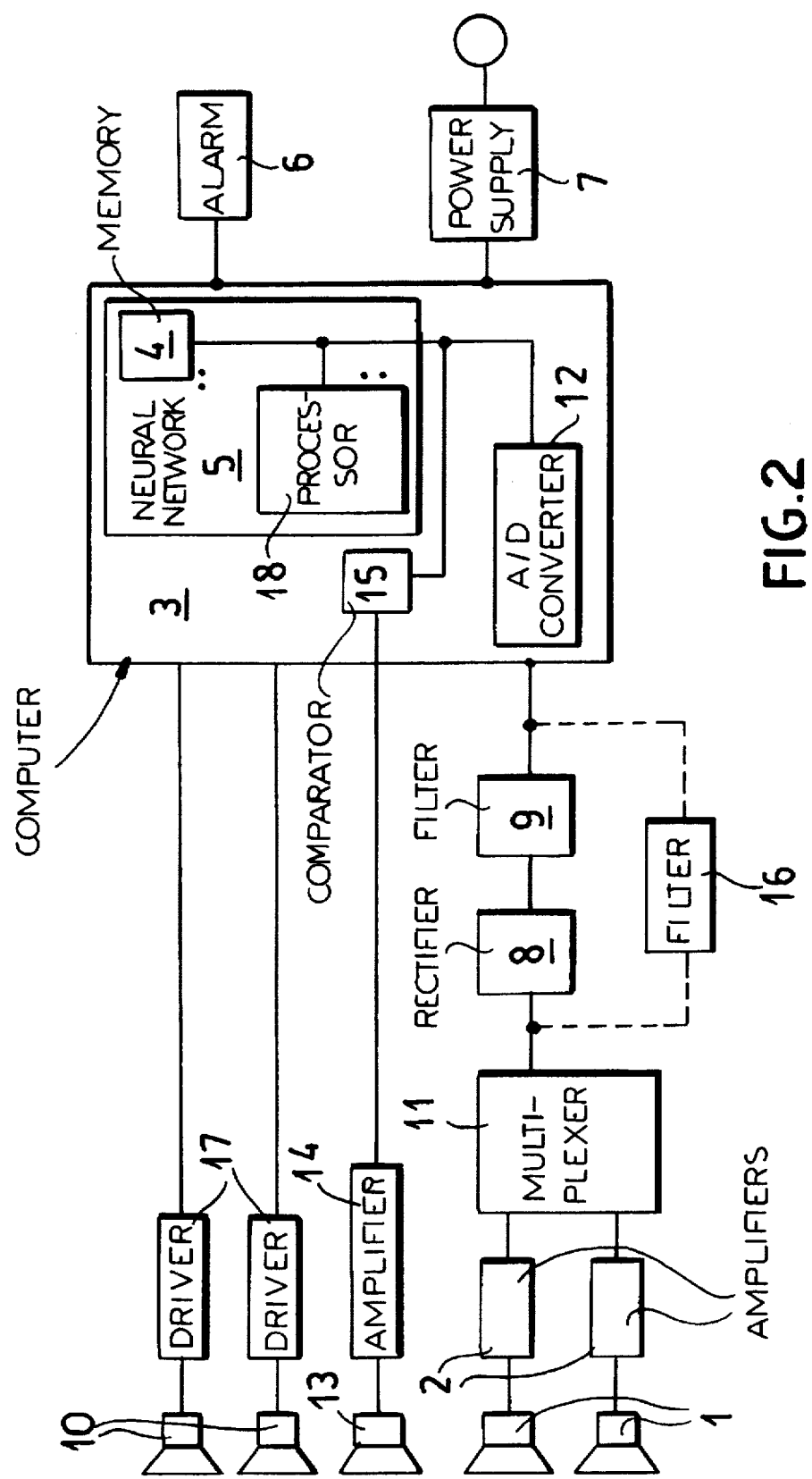
FIG. 2 is a block diagram of another embodiment thereof.

In the system of FIG. 2, an additional sound detector 13 is utilized which is connected via an amplifier 14 and a comparator 15 with the neural network and the processor system 18 thereof. The system of FIG. 2 functions essentially in the same manner as that of FIG. 1 with the significant difference being that the first mode of operation detecting glass breakage, is effected by the separate sound pick-up 13 which can have a frequency characteristic specific to the frequencies generated on glass breakage. The remainder of the system can operate in the second mode once the output from detector 13 exceed an amplitude threshold signalling glass breakage. In that case the sound wave is generated within the interior of the vehicle, reflected waves are picked up, measurement vectors are generated and the measurement vectors are compared with sample vectors to signal the incursion.

I claim:

1. A process for monitoring an interior of a vehicle against an incursion, said process comprising:
   (a) detecting a sound wave in an interior of a vehicle;
   (b) generating a time-dependent electrical measurement signal representing the detected sound wave;
   (c) amplifying said time-dependent electrical measurement signal;
   (d) feeding the amplified time-dependent electrical measurement signal to a computer and in said computer decomposing said amplified time-dependent electrical measurement signals into discrete measured-value signals and storing said discrete measured-value signals as respective individual vectors in a memory of said computer;
   (e) applying each said vectors to an input of a neural network formed by said computer and processing said vector in said neural network by comparison with at least one sample vector to form a correlation parameter representing similarity of a measured-value signal vector and a sample vector; and
   (f) activating an alarm device by said neural network in dependence upon said correlation parameter.

2. The process defined in claim 1 wherein said sample vector is formed from a measured signal in the course of an incursion into a vehicle interior and the alarm device is activated when said measured-value signal vector and a sample vector are sufficiently similar as determined by said correlation parameter.

3. The process defined in claim 1 wherein said sample vector is formed from a measured signal not in the course of an incursion into a vehicle interior and the alarm device is activated when said measured-value signal vector and a sample vector are sufficiently dissimilar as determined by said correlation parameter.

4. The process defined in claim 1 wherein said neural network is configured with the architecture of adaptive resonance theory as an ART network and the correlation parameter is an adaptive coefficient thereof.

5. The process defined in claim 1 wherein said neural network is configured with the architecture of an associative memory of the Hopfield network configuration and the correlation parameter is a Hamming distance.

6. The process defined in claim 1 wherein said computer is operated with fuzzy logic.

7. The process defined in claim 1, further comprising the step of rectifying and filtering said amplified time-dependent measuring signal to obtain an envelope curve measurement signal from which an envelope curve vector is formed in said computer and is compared with one or more envelope curve sample vectors in the computer.

8. The process defined in claim 1 wherein the amplified time-dependent measuring signal is spectrally analyzed in the computer by a fast-Fourier-transform algorithm to form a Fourier transform vector which is compared within the computer with at least one Fourier transform sample vector stored in the computer.

9. The process defined in claim 1 wherein said sample vector represents sound generated by breakage of a vehicle window.

10. The process defined in claim 1, further comprising at least one sound-wave generator communicating with said interior and generating primary sound wave pulses in said interior which are reflected and upon which other sound waves are superimposed, said detector picking up reflected superimposed sound waves and producing said time-dependent electrical measurement signal therefrom, said sample vector representing a signal containing components of reflected and superimposed waves.

11. The process defined in claim 1 wherein the comparison is effected alternately with a sample vector representing glass breakage and a sample vector representing a reflected wave in the interior upon which another sound wave is superimposed.

12. The process defined in claim 1 wherein the comparison is effected initially with a sample vector representing glass breakage and only thereafter with application of a primary sound wave pulse to said interior and comparison with a sample vector representing a reflected wave in the interior upon which another sound wave is superimposed.

13. The process defined in claim 1 wherein sound waves in said interior are picked up by a plurality of detectors with respective amplifiers, said process further comprising the step of multiplexing outputs of said amplifiers for input to said computer.

14. An apparatus for monitoring an interior of a vehicle against an incursion, comprising:

at least one detector in an interior of said vehicle for detecting a sound wave in said interior of said vehicle and generating a time-dependent electrical measurement signal representing the detected sound wave;

an amplifier connected to said detector for amplifying said time-dependent electrical measurement signal;

a computer connected to said amplifier and fed with the amplified time-dependent electrical measurement signal for decomposing said amplified time-dependent electrical measurement signals into discrete measured-value signals and storing said discrete measured-value signals as respective individual measurement vectors in a memory of said computer, said computer forming a neural network to inputs of which each of said vectors is applied for processing of said measurement vectors in said neural network by comparison with at least one sample vector to form a correlation parameter representing similarity of a measurement vector and a sample vector; and an alarm device connected to said computer and activated by said neural network in dependence upon said correlation parameter.

15. The apparatus defined in claim 14, further comprising a sound generator in said interior controlled by said computer for generating primary sound wave pulses in said interior.

16. The apparatus defined in claim 14, further comprising a rectifier and a filter connected between said amplifier and said computer for producing an envelope curve measurement signal.

17. The apparatus defined in claim 14 wherein said computer includes an analog-digital converter for converting analog measurement signals to binary digital data sets.

18. The apparatus defined in claim 14 wherein a plurality of sound detectors are provided each having a respective amplifier, said apparatus further comprising a multiplexer having a plurality of inputs each connected to one of said amplifier and an output connected to said computer.

* * * * *